United States Patent [19]

King et al.

[11] 4,009,568
[45] Mar. 1, 1977

[54] TURBINE SUPPORT STRUCTURE

[75] Inventors: Brian P. King, Greenwood; Charles H. Smale, Indianapolis, both of Ind.

[73] Assignee: General Motors Corporation, Detroit, Mich.

[22] Filed: Oct. 30, 1975

[21] Appl. No.: 627,115

[52] U.S. Cl. .............................................. 60/39.32
[51] Int. Cl.² ......................................... F02C 7/20
[58] Field of Search ........ 60/39.31, 39.32, 39.51 R, 60/39.75, 39.16 R; 415/205, 214, 219 C, 134

[56] References Cited

UNITED STATES PATENTS

| | | | |
|---|---|---|---|
| 2,622,789 | 12/1952 | Lundquist | 60/39.31 |
| 2,977,758 | 4/1961 | Haworth et al. | 60/39.31 |
| 3,037,349 | 6/1962 | Gassmann | 60/39.16 |

FOREIGN PATENTS OR APPLICATIONS

| | | | |
|---|---|---|---|
| 719,775 | 12/1954 | United Kingdom | 60/39.75 |

Primary Examiner—Carlton R. Croyle
Assistant Examiner—L. J. Casaregola
Attorney, Agent, or Firm—J. C. Evans

[57] ABSTRACT

A gas turbine engine has a turbine shroud and back seal plate to define a gas flow passage across turbine rotor blades. A conically shaped turbine support plate for the shroud and back seal plate has a central hub fixedly secured to a bearing mount on the inboard face of a scroll of a compressor for supplying air to a turbine combustor. The conical turbine support plate permits a first predetermined thermal excursion of the shroud and back seal plate to minimize gas leakage between the turbine blades and the turbine shroud components. A plurality of restrictor units are fixedly secured on the scroll and extend axially therefrom to locate a cap portion thereon in close spaced relationship to the turbine support plate to limit expansion of the turbine shroud components with respect to the rotor blades to prevent interference therebetween under elevated temperature conditions.

3 Claims, 3 Drawing Figures

TURBINE SUPPORT STRUCTURE

This invention relates to turbine gas engines and more particularly to static support structures for securing static shroud and back seal plate components of a turbine with respect to the blades of a turbine rotor.

In single shaft type gas turbine engines of a type suitable for use in automotive vehicles, motive fluid is discharged from a combustor across a turbine rotor which in turn is coupled to a compressor in the engine for supplying air to the combustor where it is mixed with fuel and ignited. The turbine also is coupled to an output shaft for powering the vehicle. In such single shaft engines, the temperature of the motive fluid directed into the turbine is 1900° F. to maintain adequate engine performance characteristics. Such operating temperature produces substantial relative thermal expansion between hotter and cooler components of the turbine section of the engine.

More particularly, in such turbine sections a turbine shroud and turbine back seal plates are arranged in close clearance relationship to the blade components of the turbine rotor to prevent gas bypass across the blades to maintain work effectiveness of the rotor. The shroud and back seal plates define the flow path across the turbine rotor and are subjected to the full temperature of the turbine motive fluid. Typically, they are supported by a static structure that is grounded to a relatively cooler operating structural component in the engine. Similarly, the hub of the rotor is likewise supported by bearing means supported by the cooler running components of the engine. As a result, there is a relative thermal expansion between the shroud and back plate components of the turbine and the rotor itself.

In cooler running gas turbine engines, it is possible to physically restrain the shroud and back seal plate components of the turbine to prevent thermal excursion therein which might cause these components to expand in a direction to reduce clearance with respect to the turbine blades and/or to increase clearance therebetween to produce undesirable gas bypass around the turbine blades and/or an actual interference between these components and the turbine rotor blades.

In turbine engines that operate under higher temperature conditions, for example in the range of 2000° F., in order to maintain engine performance, such restraint systems can produce excessive stress in the scroll and back seal plates.

Accordingly, an object of the present invention is to improve gas turbine engines operating under elevated temperature conditions by the provision therein of an improved turbine support assembly that permits a first predetermined excursion of shroud and back seal plates to maintain a controlled clearance between these components and the blades of a turbine rotor and by the further provision of a plurality of restrictor devices having a controlled thermal expansion rate to selectively contact the turbine support structure following the first predetermined excursion to limit further movement of the turbine shroud components.

A further object of the present invention is to provide an improved turbine assembly in a gas turbine engine operating under elevated temperature conditions for improved efficiency by the provision therein of a conically configured static turbine support plate having a central hub thereon secured to a bearing mount on the inboard surface of a gas turbine compressor scroll and having means on the radially outwardly located rim thereof secured to a turbine scroll and a turbine back seal plate to support these components for relatively free movement with respect to the turbine rotor so as to maintain a desired clearance between these components and the blades of a turbine rotor without producing interference therebetween and to further provide a plurality of circumferentially located ceramic rods on the compressor scroll having a limited thermal coefficient of expansion and including a cap on the tip thereof located in axially spaced relationship to an outer annular portion of the support plate and operative to engage the support plate to limit excessive thermal expansion of the shroud and back plate with respect to the rotor under elevated temperature conditions.

Yet another object of the present invention is to limit radial and axial deflection of a static support component for a turbine unit of a gas turbine engine operating under elevated temperature conditions by the provision of a plurality of control rods with a limited coefficient of thermal expansion having one end thereof connected to a relatively cool operating component of a gas turbine engine and including a cap on the opposite end thereof located in close spaced axial relationship with the turbine support component to be engageable therewith upon thermally produced deflection of the component past a predetermined maximum extent so as to limit movement of the turbine support component to control clearance between the blades of the turbine rotor and surrounding wall portions defining a gas flow passage across the blades.

Still another object of the present invention is to provide an improved static support structure for a turbine section of a gas turbine engine operated under elevated temperature conditions including a bearing mount located in a compressor scroll to locate a turbine rotor bearing in a true position with respect to the compressor rotor bearing and wherein means are provided to key the bearing mount to a conically configured turbine support plate to locate it both radially and circumferentially with respect thereto; the turbine support plate being axially located with respect to the rotor by an inner plate that defines the inboard surface for gas flow across the turbine rotor blade; the plate has a plurality of circumferentially spaced ceramic bushings thereon to freely support a plurality of variably controlled nozzle vanes at the inlet of the turbine rotor; the plate further supports a shroud assembly for the turbine including an aft plate and a front shroud component; the aft plate includes plural bores in which spacers are placed to locate the outboard shroud and establish a nozzle path height to the inlet of the turbine blades; and wherein air cooled bolts secure the front shroud to the turbine support plate; the assembly being operative in response to conduction of heat to the bearing mount to cause axial and radial deflection of the turbine support plate through a first predetermined extent; and thereafter limiting expansion by a plurality of deflection restrictor devices on the compressor scroll having a compressor scroll extension, a ceramic rod of low thermal expansion and a deflector cap set to maintain a clearance between the devices and the turbine support and wherein the clearance is determined so that deflection of the turbine support plate is snubbed prior to contact between rotor blades and shroud components of the turbine with the resultant load being transferred to the compressor scroll of the engine.

Further objects and advantages of the present invention will be apparent from the following description, reference being had to the accompanying drawings wherein a preferred embodiment of the present invention is clearly shown.

Figure 1:
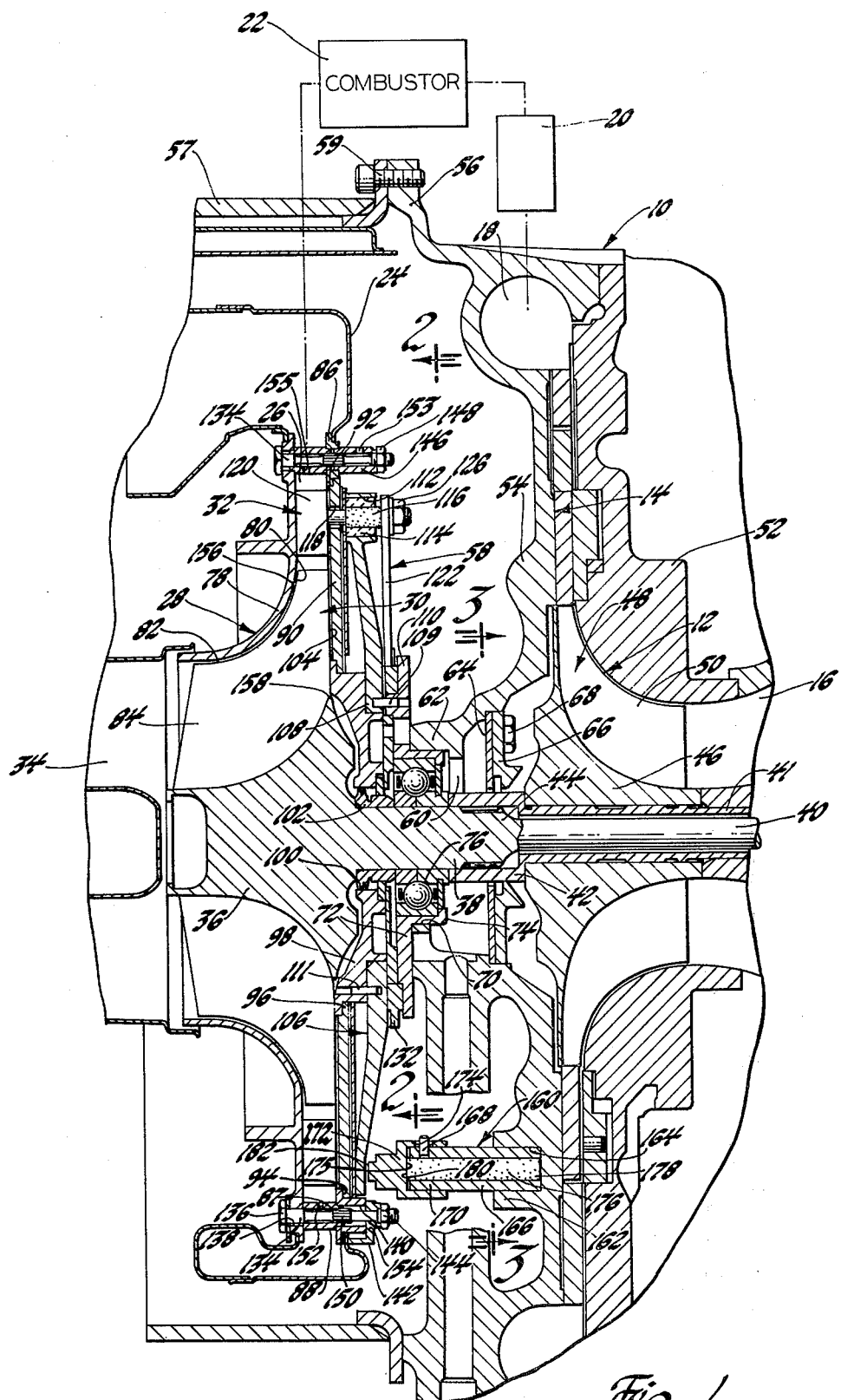
FIG. 1 is a vertical sectional view of the compressor section and turbine section of a single shaft gas turbine engine including the turbine static support structure of the present invention.

Referring now to the drawing, in FIG. 1 a fragmentary section view of a single shaft type gas turbine engine 10 is illustrated. It employs variable geometry in the turbine section thereof to achieve low emissions characteristics required in automotive application as well as performance charactertistics in part produced by virtue of the fact that the engine combustion temperature directs motive fluid having temperature in the range of 1900° F. to the turbine section. More particularly, the engine 10 includes a compressor section 12 of a centrifugal design. It includes variable inlet guide vanes (not shown) and a variable exit diffuser vane assembly 14 of the type set forth more particularly in copending United States application Ser. No. 585,344 filed June 9, 1975 to Lunsford et al. The variable exit diffuser vane assembly 14 allows operation of the engine over a much wider flow range than in conventional design as is more particularly set forth in the aforesaid application.

Air enters the compressor section 12 from an inlet 16. Discharge from the variable diffuser vane assembly 14 is directed into a constant velocity compressor scroll cavity 18 and is directed to a recuperative heat exchanger shown diagrammatically at 20. Air flow from the recuperator heat exchanger 20 is directed to a combustor 22 shown diagramatically in FIG. 1 and through an outlet 24 of the combustor 22 which is in communication with the inlet 26 to a turbine section 28 of the engine. Heated air flow from the combustor outlet 24 is fed across a radial inflow type turbine rotor 30 from a variable turbine vane assembly 32 and is thereafter discharged to an exit diffuser 34 from whence air is directed to the recuperator 20 for heat transfer to the compressed air from the compressor section 12.

The turbine rotor 30 has a hub 36 with an integrally formed shaft 38 with a turbine output shaft extension 40 directed through a compressor drive shaft 41 which is telescoped over the extension 40 and includes an internally splined inboard end 42 coupled to a splined segment 44 on shaft 38. The compressor drive shaft 41 is fixedly connected to the hub 46 of a centrifugal compressor impeller 48 in the compressor section 12 including a plurality of centrifugal flow blades 50 thereon contained by a scroll cover 52 on the outboard side of the compressor section 12. The impeller 48 is closed on its inboard side by a scroll casting 54 connected at a radially outwardly directed flange 56 thereof to the outer engine casing 57 by a plurality of circumferentially spaced bolts 59. Thus the scroll casting 54 serves as a base static support component, operating under relatively reduced temperatures within the engine 10. This characterisitic of the scroll casting 54 is utilized in association with an improved turbine static support structure 58 to be discussed to control the location of components in the turbine section 12.

The trubine section 12 is separated from a bearing oil cavity 60 formed in an axial extension 62 on casting 54 by means of an annular closure plate 64 secured to the scroll casting 54 by a retainer ring 66 and a plurality of fasteners respresentively illustrated as screws 68. The extension 62 includes an internal bore 70 that serves as the structural ground point for the static turbine support structure 58 of the present invention.

The aforedescribed sections of the gas turbine engine 10 are set forth for purposes of establishing environment of the present invention and to define the basic gas turbine flow pattern and power take-off of a gas turbine engine utilizing the present invention.

Referring now more particularly to the static support structure 58 of the present invention, it includes a bearing mount 72 having an axial extension 74 supportingly received within the bore 70 and including a bearing assembly 76 therein that rotatably supports the shaft 38 of the rotor 30.

The static turbine support structure 58 controls the relationship of a turbine shroud 78 having a curvilinear inner surface 80 thereon located in close spaced relationship to the outer edge 82 of the radially directed blades 84 of the rotor 30. Additionally, it supports a second turbine shroud component in the form of an aft plate 86 having a continuous circumferential extent and including a plurality of circumferentially spaced holes 87 that receive a plurality of individual tubular spacer elements 88 having one end thereof in engagement with the inner surface 80 of the shroud 78 at the outer periphery thereof and having an inboard surface thereon in engagement with the inboard surface of the aft plate 86. The spacer elements 88 locate the outer turbine shroud 78 in space, axially with respect to the rotor 30 and further establishes a nozzle path height at the inlet 26 to the turbine section 28. The shroud assembly further includes an outer, back seal plate 90 that is supportingly received at the outer periphery 92 thereof within a shoulder 94 on the aft support plate 86. Seal plate 90 has a radially inwardly located shoulder 96 thereon supportingly received on an inner, back seal plate 98 with an internal bore 100 through which the shaft 38 is directed. Shaft 38 carries an annular seal element 102 that engages bore 100 to seal the turbine gas flow path from the bearing oil cavity 60.

The shroud assembly made up by the shroud 78, aft plate 86, outer, back seal plate 90 and inner, back seal plate 98 are subjected to the high operating temperature of motive fluid from the combustor outlet 24 and operate at a temperature substantially in excess of that found in the bearing sump region represented by the extension 62 and the cooler operating scroll casting 54. The present invention supports these components to allow a first predetermined freedom of movement with respect to the turbine rotor 30 so long as the movement maintains a desired clearance between the blade edge 82 and the inner surface 80 of shroud 78 and a rear clearance between the seal plates 90, 98 and the rear edges 104 of each of the blades 84. The clearance must be maintained within desired limits to prevent excessive gas bypass between the shroud assembly components and the rotor that would otherwise reduce the output power of the turbine engine and within desired limits to avoid interference between the shroud components and the rotor 30.

To accomplish this purpose, the turbine static support structure 58 includes a conically shaped turbine support plate 106 located axially of the outer and inner seal plates 90, 98. It includes a central, radially inwardly located hub 108 supported on and keyed at 109 to an extension 110 of the bearing mount 72. Axial location of the turbine support plate 106 is controlled by the inner seal plate 98. Circumferential location of inner seal plate 98 to the conically configured turbine support plate 106 is controlled by a dowel pin 111. The turbine support plate 106 includes five, circumferentially spaced key ways 113 along the outer periphery thereof that are secured to the aft plate 86 for supportingly receiving other components of the shroud assembly including both the seal plates 90, 98 as well as the shroud 78.

Additionally, the turbine support plate 106 has a plurality of bores 112 formed at circumferentially spaced points around the radially outer circumference thereof. Each of them receives a ceramic bushing 114 which supportingly receives a shaft 116 directed through bushing 114 and a bore 118 in the outer seal plate 90 to be secured to a variable geometry vane 120 supported within the inlet 26 to the rotor 30. Each of the shafts 116 is coated by a layer of ceramic material in the portion thereof supported by bushing 114 for a freedom of rotation of the shaft 116 with respect to the bushing 114 under operating conditions in the 1900° F level. Further, the bushings 114 limit heat conduction to support plate 106. Each shaft 116 is connected to an operating lever 122 outboard of the support plate 106. Each lever 122 is fixedly secured to the shaft by means of a lock element 124 secured to the shaft by means of a nut 126. Each operating lever 122 alos includes a radially inwardly located tip 128 located in a slot 130 of an annular operating ring 132 connected to suitable means for rotating ring 132 to thereby shift each vane 120 to produce a controlled rate of flow of motive fluid from the combustor 22 in accordance with engine operating conditions.

Figure 2:
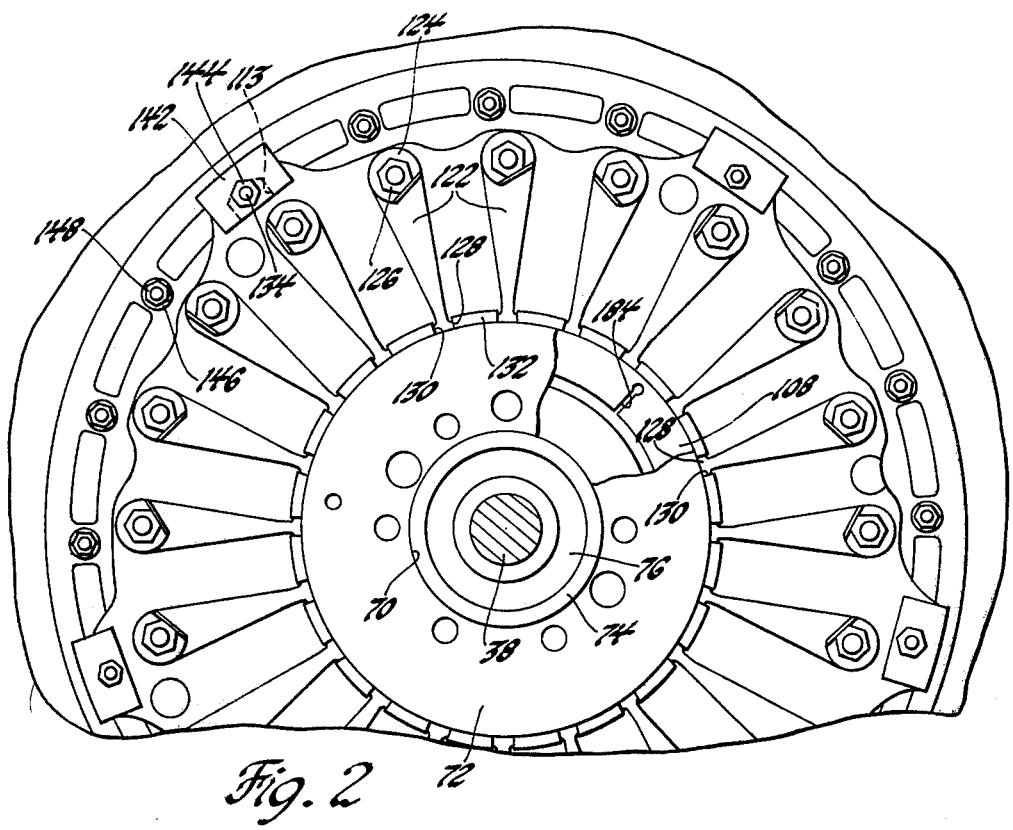
FIG. 2 is a vertical sectional view taken along the line 2—2 of FIG. 1 looking in the direction of the arrows.
Figure 3:
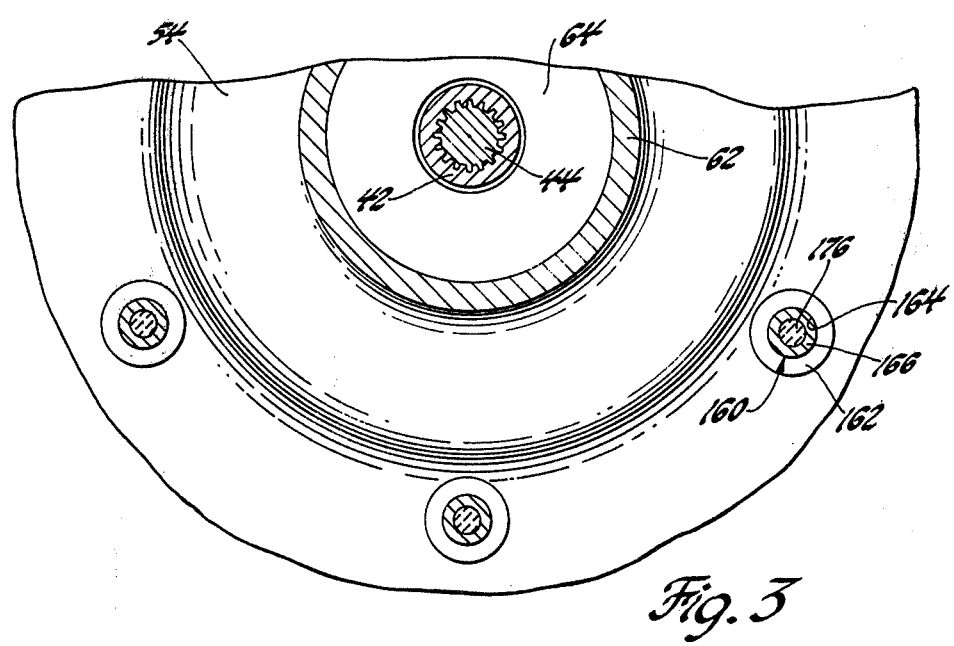
FIG. 3 is a vertical sectional view taken along the line 3—3 of FIG. 1 looking in the direction of the arrows.

Axial connection between the shroud 78 and the remaining components of the shroud assembly and connection to the key ways 113 of the support plate 106 is accomplished by means of a plurality of circumferentially spaced connector bolts 134 having head portions 136 located on the outboard face of the shroud 78. Each of them are directed through a bore 138 of the shroud 78 thence through a tubular spacer element 88 and thence through a hole 140 in the aft plate 86. Each of the bolts 134 which extend through the aft plate 86 at the key way 113 are fastened to a clamp 142 that holds support plate 106 to plate 86 by means of a nut 144 as shown in FIG. 2.

Each of the remaining bolts 134 are directed through a spacer element 146 that seats against the aft plate 86 at one end thereof and receives a nut 148 at the opposite end thereof to threadably secure the bolt 134 against the shroud 78 and to the aft plate 86. Each of the bolts feature a midspan serrated mute 150 to equalize the temperature along the bolt. Furthermore, each of the spacer elements 88 includes a passageway 152 to permit air from an inlet air port 153 therein or a port 154 in the aft plate 86 for flow of cooling air across the bolts 134 for discharge through port 155 into the turbine gas stream. Fifteen turbine bolts fasten the shroud, spacer and aft plate as an assembly. Five bolts through the key ways 113 attach the shroud assembly to the turbine support plate.

By virtue of the aforesaid system, when the turbine section 28 is operating at elevated temperature conditions, there is a first predetermined movement of the shroud 78 and back seal plates 90, 98 with respect to the rotor 30 to maintain at least 0.015 inches of running clearance in the area of interference region 156 and 158 on the rotor 30. In order to avoid interference at the regions 156, 158, following the first predetermined freedom of movement of the aforedescribed turbine static support and shroud assembly structure, a plurality of deflection restrictor devices 160 are located between the compressor section 12 and the turbine section 28 for limiting the maximum excursion of the static structure under maximum temperature conditions.

More particularly, the deflection restrictor assemblies 160 are arranged and configured to become an active part of the turbine static support structure 58 following a predetermined first excursion of the structure. Each assembly 160 includes a scroll support surface 162 forming a bore 164 on the outer surface of casting 54. The bore 164 receives one end of a tubular scroll extension 166 having a pin 168 secured in the opposite free end 170 thereof. The free end 170 supportingly receives a cap 172 secured thereon by pin 168. Cap 172 has a side slot 174 to permit sliding movement of the cap with respect to the extension 166. The end of the extension 166 is spaced from an inboard surface 175 of the cap so that it is initially an inactive element in the support. Cap 172 is positioned by a ceramic rod 176 within extension 166. It has one end 178 thereof in engagement with the scroll 54 and the opposite end 180 thereof in engagement with the surface 175. It serves as a rigid strut between the cap 172 and the scroll 54. The rod 176 is a heat insulator to prevent excessive heat flow from the turbine structure to the compressor scroll 54. Furthermore, the ceramic rod 176 is constructed of a material having a low coefficient of thermal expansion as compared to the remaining components of the turbine section 28. In one working embodiment, it is formed of a cordierite ceramic material having a thermal expansion rate of $2 \times 10^{-7}$ inch per inch per degree centigrade through a temperature range of from room temperature to 1000° C. As a result, the rod 176 maintains the cap 172 at a fixed axial relationship with respect to the static support plate 106. More particularly, it maintains a flat surface 182 on the end thereof in a close spaced relationship to the inboard surface of the support plate 106. This space will be maintained through the first predetermined deflection of the shroud components. Furthermore, it will be closely maintained by virtue of thermal expansion properties of the rod 176. However, once the shroud assembly movement nears a point to cause interference at regions 156, 158, the assemblies 160 will supportingly receive the support plate 106 and become an active part of the support structure to transfer part of the load to the scroll casting 54. The assemblies 160 thereby assure against excessive excursion of the shroud assembly in the interference region 156. Interference in the region 158 is controlled by the stack of component parts and the movement of rotor 30. In order to prevent excessive stress build up at the central hub 108 of the support plate 106 under this mode of operation, a plurality of circumferentially spaced stress risers 184 extend radially through the hub 108.

While the embodiment of the present invention, as herein disclosed, constitutes a preferred form, it is to be understood that other forms might be adopted.

The embodiments of the invention in which an exclusive property or privilege is claimed are defined as follows:

1. In a gas turbine engine of the type having a combustor and compressor with means including an inboard scroll operated at a reduced temperature and a radial turbine including a rotor having a shaft connected to the compressor and shroud components for defining a flow path across the rotor operated at a temperature in excess of the compressor temperature, the improvement comprising: means for supporting the shroud components including a radially inwardly located bearing support secured to the compressor scroll, an annular conically dished turbine support plate located radially outwardly of the shaft of the turbine rotor and including a peripheral surface thereon located axially of the shroud components, means for securing the shroud components to the turbine support plate, means for securing said turbine support plate to said bearing support, said trubine support plate being subjected to heat conduction from the turbine flow path to said bearing support during turbine operation to produce an axial and radial thermogradient thereacross capable of producing a relative deflection between the turbine rotor and the shroud components, means forming a plurality of circumferentially spaced support surfaces on the compressor scroll at a point axially spaced from the turbine support plate, a ceramic rod extending axially outwardly of each of said support surfaces having a low coefficient of thermal expansion to maintain a control length from the compressor scroll during temperature excursion of the turbine, means on each of said ceramic rods including an axial end surface located in close spaced relationship to said turbine support plate to permit a first predetermined deflection of the turbine support plate, said end surface engaging the turbine support plate upon a predetermined deflection occurring therein to limit the movement of the turbine support plate to maintain a desired clearance between the rotor and the shroud components with the ceramic rods serving to transfer the additional loading from the turbine support plate directly to the compressor scroll.

2. In a gas turbine engine of the type having a combustor and compressor with means including an inboard scroll operated at a reduced temperature and a turbine including a rotor having a shaft connected to the compressor and shroud components for defining a flow path across the rotor operated at a temperture in excess of the compressor temperature, the improvement comprising: means for supporting the shroud components including a radially inwardly located bearing assembly for supporting the rotor shaft, a bearing support in said assembly, means for securing said bearing support to said scroll, an annular conically dished turbine support plate located radially outwardly of the shaft of the turbine rotor and including a periphery thereon located axially of the shroud components of the turbine, coacting means on said turbine support plate periphery and the shroud components for securing the shroud components to said turbine support plate, coacting means formed between said turbine support plate and said bearing support for locating said turbine support plate both circumferentially and axially of said bearing support, said turbine support plate being subjected to heat conduction from the turbine rotor flow path to said bearing assembly during turbine operation to produce an axial and radial thermogradient thereacross capable of producing relative deflection between the turbine rotor and the shroud components, means forming a plurality of circumferentially spaced support surfaces on the compressor scroll at a point axially spaced from the turbine support plate, a ceramic rod extending axially outwardly of each of said support surfaces having a low coefficient of thermal expansion to maintain a control length from the compressor scroll during temperature excursions of the turbine, each of said ceramic rods including an end cap thereon, means for securing the end cap on the end of the ceramic rod against axial movement with respect thereto, said end cap including an axial end surface thereon located in close spaced relationship to said turbine support plate to permit a first predetermined deflection of the turbine support plate, said axial end surface engaging the turbine support plate upon a predetermined deflection occurring therein to limit the movement of the turbine support plate to maintain a desired clearance between the turbine rotor and the shroud components with the ceramic rods serving to transfer the additional loading from the turbine support plate directly to the compressor scroll.

3. In a gas turbine engine having a combustor and compressor with a scroll thereon operating at a reduced temperature and further including a high temperature turbine with a turbine rotor including a radially inwardly located shaft and including an outer shroud and an aft located seal plate to form the fore and aft walls of a turbine flow path across the impeller, the improvement comprising: a bearing mount, means thereon for locating said bearing mount with respect to the compressor, bearing means in said mount for supporting the rotor shaft, an annular turbine support plate located radially outwardly of the shaft of the turbine and axially aft of the seal plate, means for securing said support plate on said bearing mount, means including turbine inlet guide vanes for directing motive fluid to the rotor, means supporting said turbine inlet guide vanes on said turbine support plate, said last mentioned means including means for limiting heat conduction from said vanes to said turbine support plate, means including a plurality of fasteners directed through said turbine support plate and connected to the outer shroud and the aft seal plate to define the flow path across the rotor, said turbine support plate being subjected to heat conduction from the turbine flow path to said bearing support to produce both an axial and radial thermal gradient therein to produce relative deflection between the outer shroud and aft seal plate and the rotor, means for controlling such relative deflection to prevent interference between the outer shroud, aft seal plate and rotor, said means including a plurality of supports located circumferentially on the scroll of the compressor, a ceramic support rod received in each of said supports and extending axially outwardly therefrom and having a low coefficient of thermal expansion to maintain a fixed axial reference length from the compressor scroll, means forming an axial end surface on said rod located in axial spaced relationship to the outer periphery of the turbine support plate and having a clearance established therebetween to cause the turbine support plate to be in contact with the axial end surface when it is subjected to a thermal gradient capable of producing interference between the turbine rotor and the adjacent flow path walls, said rod upon engagement with said trurbine support plate transferring a resultant load from the turbine support plate to the compressor scroll.

* * * * *